US008622199B2

(12) United States Patent
Windfeld et al.

(10) Patent No.: US 8,622,199 B2
(45) Date of Patent: Jan. 7, 2014

(54) ADJUSTABLE CONVEYOR EXTENSIONS

(75) Inventors: Helle Windfeld, Hørning (DK); Brian B. Nielsen, Horsens (DK); Jens Erik Langdahl, Åbyhøj (DK); Mogens Brinch, Ørsted (DK)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 12/977,977

(22) Filed: Dec. 23, 2010

(65) Prior Publication Data

US 2012/0160636 A1 Jun. 28, 2012

(51) Int. Cl.
*B65G 15/26* (2006.01)

(52) U.S. Cl.
USPC ........................................ 198/588; 198/589

(58) Field of Classification Search
USPC .............. 198/588, 589, 594, 595, 812, 861.2
See application file for complete search history.

(56) References Cited

U.S. PATENT DOCUMENTS

| | | | | |
|---|---|---|---|---|
| 981,085 | A | * | 1/1911 | Heser ............................ 198/589 |
| 3,651,963 | A | * | 3/1972 | McWilliams ............... 414/789.8 |
| 4,279,555 | A | * | 7/1981 | Rydell ........................ 414/793.8 |
| 4,643,299 | A |  | 2/1987 | Calundan |
| 5,642,803 | A | * | 7/1997 | Tanaka .......................... 198/535 |
| 5,697,753 | A | * | 12/1997 | Aurora et al. .................. 414/398 |
| 5,796,052 | A |  | 8/1998 | Christmann |
| 6,006,893 | A | * | 12/1999 | Gilmore et al. ............... 198/588 |
| 6,431,346 | B1 | * | 8/2002 | Gilmore et al. ............... 198/588 |
| 6,481,563 | B1 | * | 11/2002 | Gilmore ........................ 198/511 |
| 6,484,862 | B1 | * | 11/2002 | Gilmore et al. ........... 193/35 TE |
| 6,533,096 | B2 | * | 3/2003 | Gilmore et al. ........... 193/35 TE |
| 6,655,893 | B2 | * | 12/2003 | Kelly et al. .................... 414/393 |
| 7,108,125 | B2 | * | 9/2006 | Gilmore et al. ............... 198/812 |
| 7,168,555 | B2 |  | 1/2007 | Peterson |

(Continued)

FOREIGN PATENT DOCUMENTS

| | | |
|---|---|---|
| EP | 0764600 | 3/1997 |
| FR | 2085385 | 12/1971 |
| WO | 0179093 | 10/2001 |
| WO | 2005092706 | 10/2005 |

OTHER PUBLICATIONS

International Searching Authority, "International Search Report," issued in connection with application serial No. PCT/US2011/066887, issued Jun. 6, 2012, 7 pages.

International Searching Authority, "Written Opinion of the International Searching Authority," issued in connection with application serial No. PCT/US2011/066887, issued Jun. 6, 2012, 10 pages.

(Continued)

*Primary Examiner* — Gene Crawford
*Assistant Examiner* — Keith R Campbell
(74) *Attorney, Agent, or Firm* — Hanley, Flight & Zimmerman, LLC.

(57) ABSTRACT

Example conveyor systems are disclosed herein. An example conveyor system includes a main conveyor with a frame supporting at least one conveyor extension. Some conveyor extension examples include a powered conveyor belt supported by one or more conveyor sections that are articulated for assisting one or more workers in transferring items (e.g., boxes, parcels, luggage, parts, etc.) to and from the main conveyor. A single main conveyor supports two conveyor extensions mounted alongside each other with someone working at each extension to allow two workers to service a single main conveyor with minimal or no interference, thereby increasing the conveyor system's overall transfer rate. Example conveyor system disclosed herein includes various elements of positional adjustment (e.g., lateral, longitudinal, vertical, angular) to make the conveyor system particularly suited for transferring parcels between a loading dock and the interior of a truck, trailer, aircraft or container.

23 Claims, 7 Drawing Sheets

(56) References Cited

U.S. PATENT DOCUMENTS

| | | | |
|---|---|---|---|
| 7,641,043 B2 * | 1/2010 | Vestergaard | 198/592 |
| 8,262,334 B2 * | 9/2012 | Christensen et al. | 414/398 |
| 2001/0009217 A1 * | 7/2001 | Gilmore et al. | 198/812 |
| 2005/0217981 A1 * | 10/2005 | Peterson | 198/812 |
| 2008/0118337 A1 | 5/2008 | Vestergaard | |
| 2012/0097498 A1 * | 4/2012 | Campbell et al. | 198/317 |

OTHER PUBLICATIONS

International Searching Authority, "Invitation to Pay Additional Fees and Partial Search Report," issued in connection with international application serial No. PCT/US2011/066887, mailed Mar. 23, 2012, 7 pages.

European Patent Office, "Communication Pursuant to Rules 161(1) and 162 EPC," issued in connection with EP Application No. 11810966.9, dated Aug. 21, 2013, 2 pages.

* cited by examiner

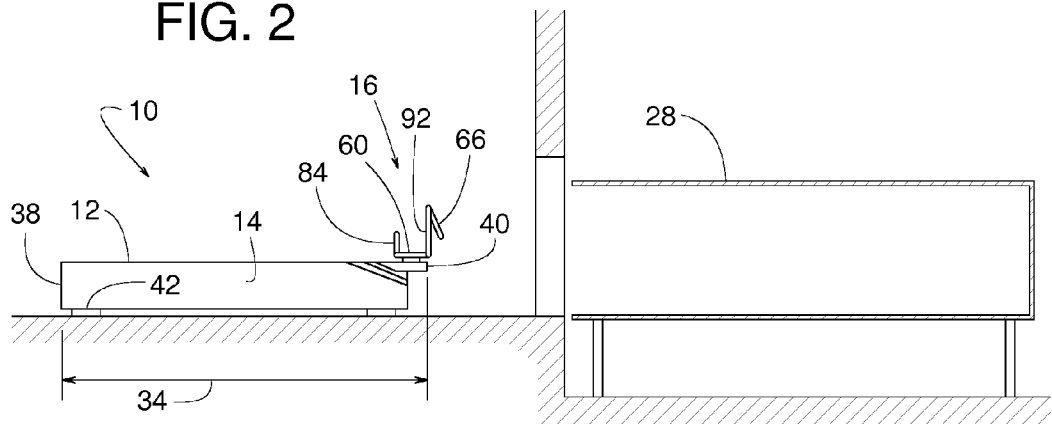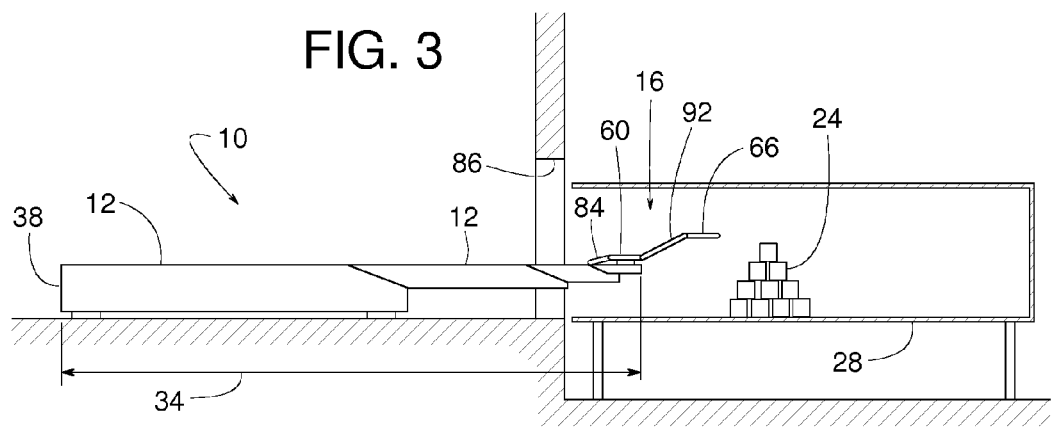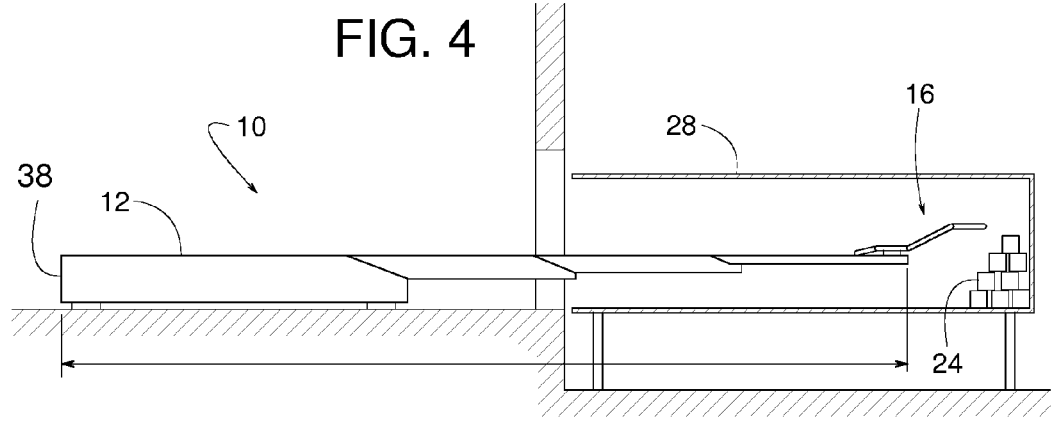

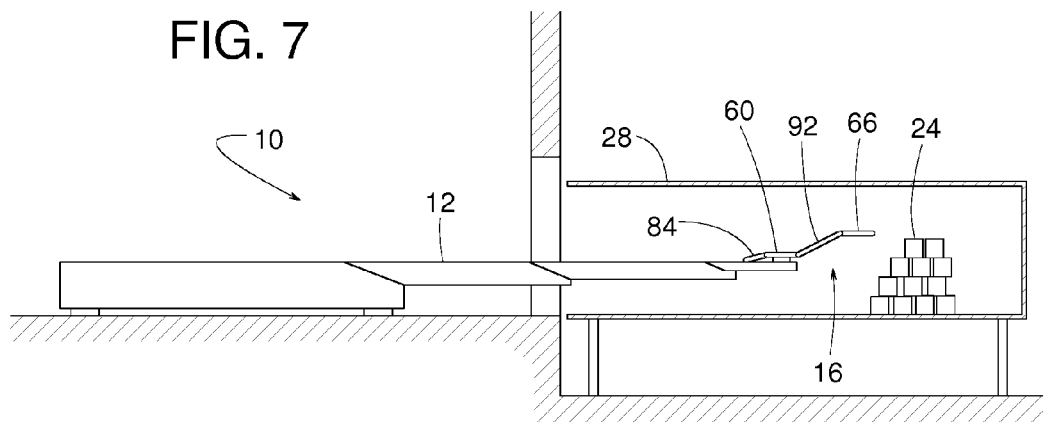
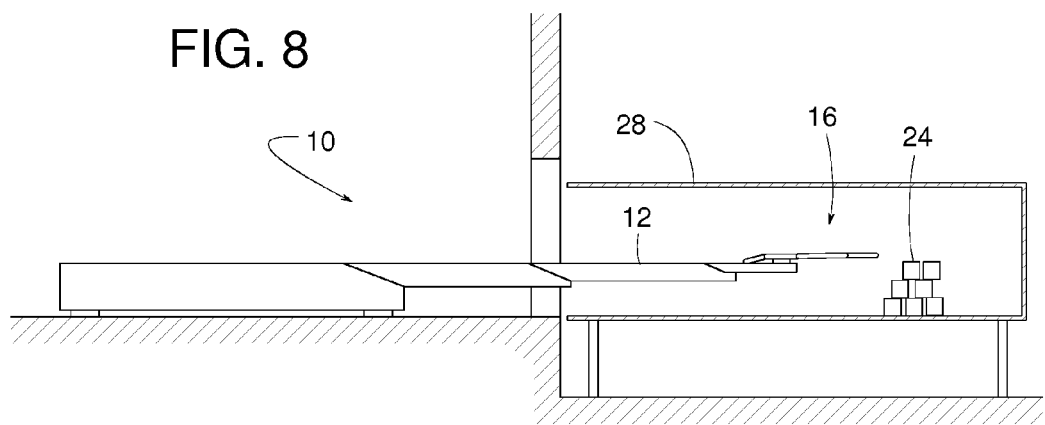
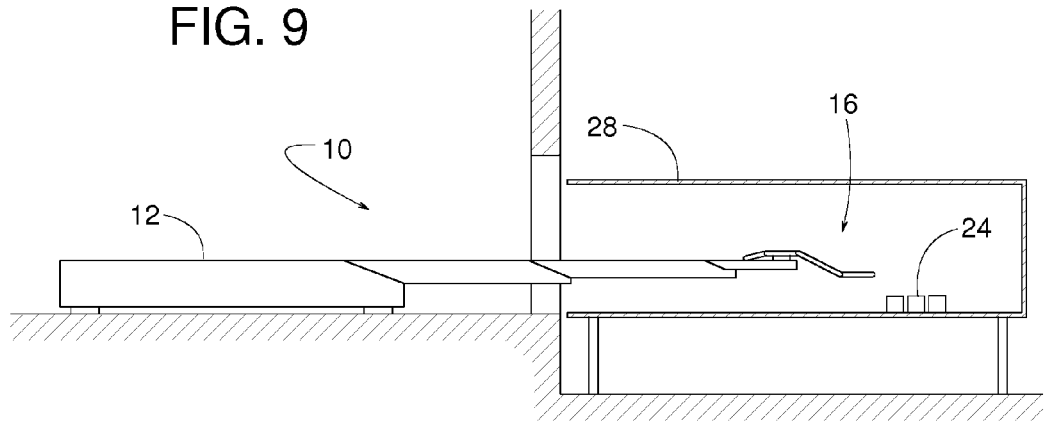

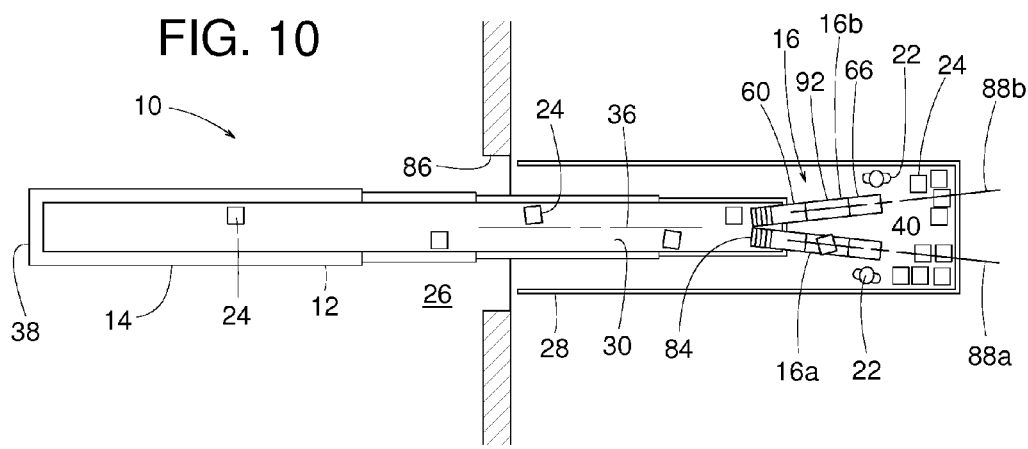
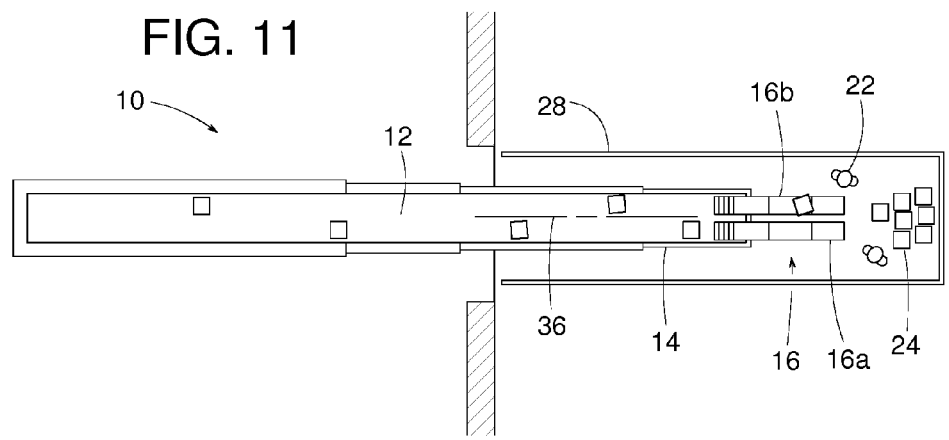
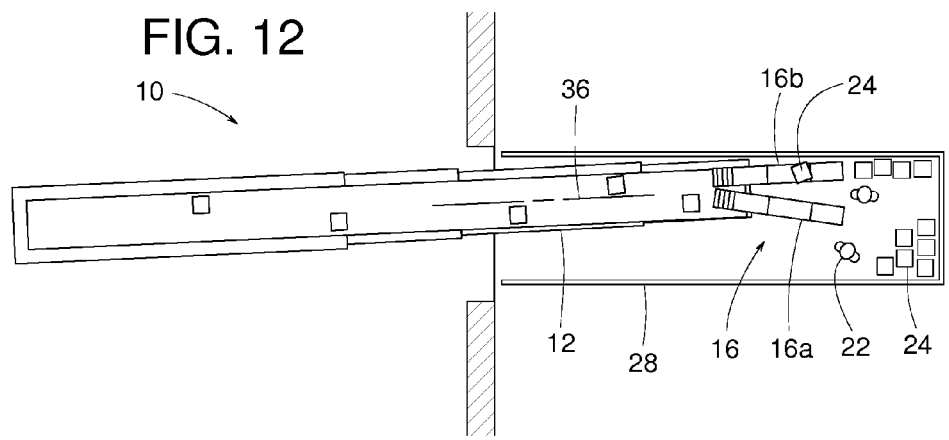

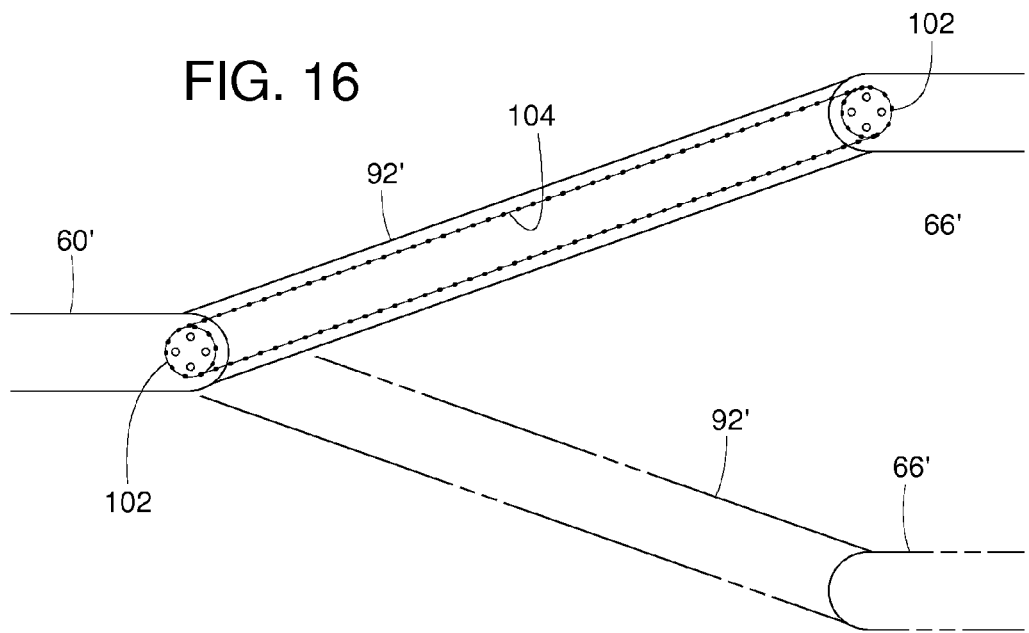
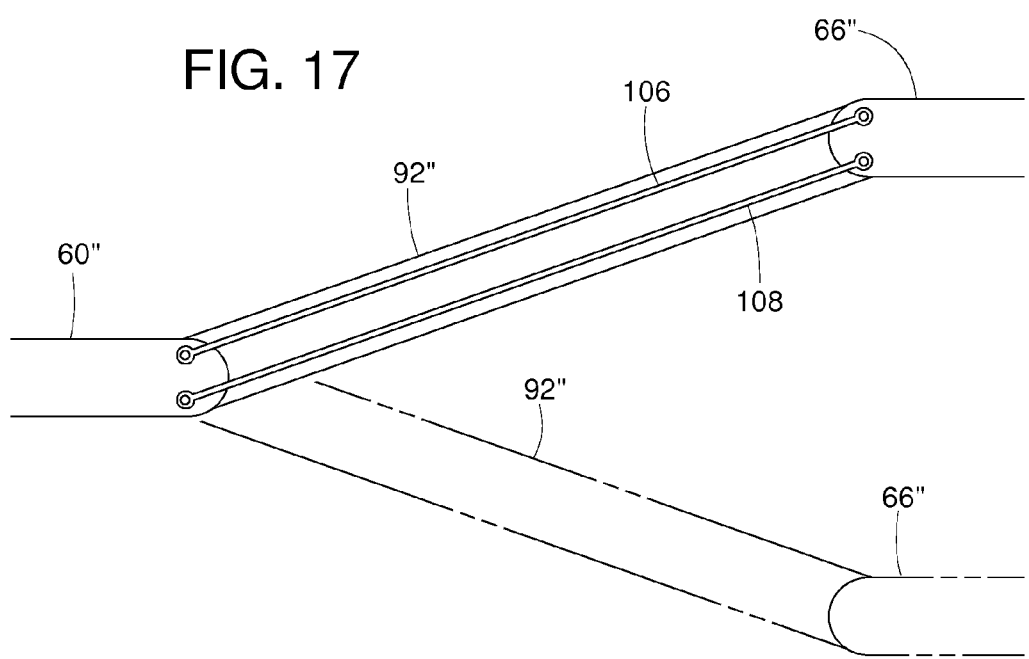

ADJUSTABLE CONVEYOR EXTENSIONS

FIELD OF THE DISCLOSURE

This patent generally pertains to conveyors and, more specifically, to adjustable conveyor extensions.

BACKGROUND

Conveyors are mechanical devices that typically include a plurality of rollers (e.g., cylindrical or spherical rollers) that carry and transfer items over some distance or travel path. In some examples, the travel path across an upper conveying surface of the conveyor can be horizontal or at an incline (positive or negative slope). In some examples, the conveying surface is a powered belt for moving or transferring the items over some distance. In yet other cases, the conveying surface of some conveyors have powered rollers for moving the items, but other examples, the rollers are passive, free spinning rollers, where the items being transferred move along the travel path by gravity. In some cases, a moving belt overlays the rollers to help support the items on the conveyor. Conveyors are used in a wide variety of material handling applications such as for moving boxes, parcels, luggage, parts and other items.

BRIEF DESCRIPTION OF THE DRAWINGS

FIG. 2 is a side view of the example conveyor system of FIG. 1, with the conveyor system shown in a retracted, stored position.

FIG. 3 is a side view similar to FIG. 2, but showing the conveyor system's main conveyor partially extended.

FIG. 4 is a side view similar to FIGS. 2-3, but showing the main conveyor fully extended.

FIG. 7 is a side view similar to FIG. 3, but showing the main conveyor extending farther into a container with an example conveyor extension disclosed herein at a first position.

FIG. 8 is a side view similar to FIG. 7, but showing the example conveyor extension midway between the first position and a second position.

FIG. 9 is a side view similar to FIGS. 7 and 8, but showing the example conveyor extension described herein at the second position . . . .

FIG. 10 is a top view of the conveyor system of FIGS. 1-9, having example conveyor extensions adjusted laterally outward.

FIG. 11 is a top view similar to FIG. 10, but showing the example conveyor extensions adjusted laterally inward.

FIG. 12 is a top view similar to FIGS. 10 and 11, but showing the main conveyor biased to one side with only one conveyor extension adjusted laterally outward.

FIG. 16 is a schematic side view of an example mechanism or assembly to maintain a predetermined rotational relationship between proximal and distal sections of an example articulated conveyor extension assembly disclosed herein.

FIG. 17 is a schematic side view of another example mechanism or assembly to maintain a predetermined rotational relationship between proximal and distal sections of another example articulated conveyor extension assembly disclosed herein.

DETAILED DESCRIPTION

Figure 1:
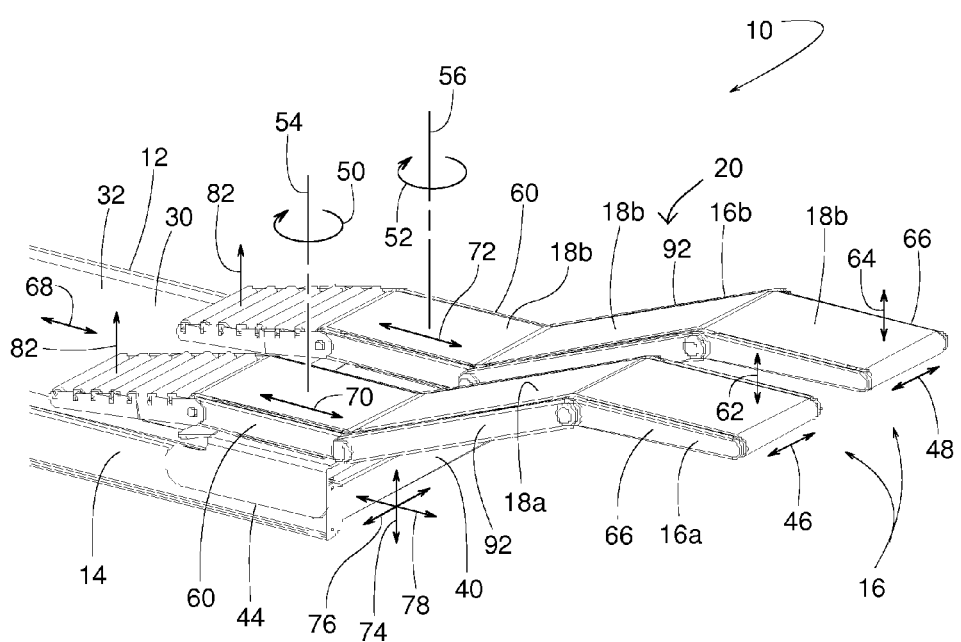
FIG. 1 is a perspective view of an example conveyor system disclosed herein with two example conveyor extensions.

FIGS. 1-15 show an example conveyor system 10 disclosed herein that includes an example main conveyor 12 with an example frame 14 supporting at least one example conveyor extension 16. In some examples, conveyor extension 16 includes a powered conveyor belt system 18 (e.g., a first powered belt 18a or a second powered belt 18b) supported by one or more conveyor sections 20 that are articulated or otherwise adjustably movable for assisting one or more workers 22 in transferring items 24 (e.g., boxes, parcels, luggage, parts, etc.) to and from main conveyor 12, as shown for example in FIGS. 10-12. The belt system 18, the conveyor extensions 16 and/or the conveyor sections 20 provide a continuous or smooth transition when transferring items 24 between the main conveyor 12 and the conveyor extension 16 (e.g., distal ends of the conveyor extension 16). When a single main conveyor (e.g., the main conveyor 12) supports two conveyor extensions 16 (e.g., conveyor extensions 16a, 16b) mounted alongside each other with someone working at each extension, such an arrangement allows two workers 22 to service a single main conveyor with minimal or no interference, thereby increasing the conveyor system's overall transfer rate or efficiency. In the illustrated example, positional adjustment (e.g., lateral, longitudinal, vertical, angular) of various elements of the conveyor system 10 (e.g., the main conveyor 12, the conveyor extension 16, etc.) make conveyor system 10 particularly suited for transferring parcels between a loading dock 26 (or some other area) and the interior of a truck, trailer, aircraft or container; all of which will be referred to hereinafter as a container 28. For example, the main conveyor 12 may be adjustable (e.g., laterally, longitudinally, vertically, angularly) relative to a floor of the container 28. Additionally or alternatively, conveyor extension 16 can be adjustable (e.g., laterally, longitudinally, vertically, angularly) relative to a floor of the container 28 and/or the main conveyor 12.

For the illustrated example, main conveyor 12 includes frame 14 supporting a continuous conveyor belt 30 (e.g., a powered main belt) that has a first conveying or upper traveling surface 32 for moving items 24 along the main conveyor 12. Frame 14 has a length 34 (FIGS. 2-4) extending along a longitudinal centerline 36 (FIGS. 10-12) from a back end 38 to a front end 40. Although in some examples the main conveyor frame 14 is of a fixed length, in this particular example, length 34 is adjustable by virtue of frame 14 being telescopic. Examples of such extendable telescopic conveyors are disclosed in U.S. Pat. Nos. 4,643,299; 5,796,052 and 7,168,555, all of which are incorporated herein by reference in their entireties. In some examples, main conveyor 12 includes a base 42 and/or other features that enable main conveyor 12 to be adjustable vertically (see FIGS. 5 and 6) and adjustable laterally (see FIGS. 11 and 12) relative to, for example, a floor of the container 28.

Although in some examples, only a single conveyor extension 16 is mounted to main conveyor 12, the illustrated example shows an adaptor plate 44 to hold two conveyor extensions 16a and 16b to frame 14 of main conveyor 12. Adaptor plate 44, main conveyor 12 and conveyor extensions 16a and 16b include various features that make conveyor system 10 adjustable and movable, as indicated by the arrows shown in FIG. 1 and described below.

Arrows 46 and 48, for instance, indicate lateral adjustment of conveyor extensions 16a and 16b. In some examples, lateral movement 46 and 48 of the conveyor extensions 16a and 16b is achieved through rotational movement 50 and 52 about respective vertical axis 54 and 56, where each rotational movement 54 and 56 is enabled by a swivel joint 58 (e.g., a thrust bearing of FIG. 13) between adaptor plate 44 and a proximal conveyor section 60 of each conveyor extensions 16a and 16b. Arrows 62 and 64 indicate vertical adjustment of a distal conveyor section 66 of each conveyor extension 16a and 16b relative to the centerline 36 and/or the floor of the container 28. Arrows 68, 70, and 72 represent belt movement of main conveyor 12, conveyor extension 16a and conveyor extension 16b, respectively. Arrows 74, 76 and 78 represent respective vertical, lateral and longitudinal adjustment of the main conveyor's front end 40. Arrows 80 and 82 represent upward pivotal movement of a transition conveyor 84 of each of the conveyor extensions 16a and 16b. The foregoing adjustments and movements provide conveyor system 10 with various configurations or positions to accommodate for different loading/unloading operations.

FIG. 2 shows main conveyor 12 retracted with conveyor extension 16 in a compact, or retracted configuration, which places conveyor system 10 is a stored configuration. FIG. 3 shows main conveyor 12 protruding through a doorway 86 and partially extending into container 28, where conveyor system 10 is properly situated to receive or unload items 24 in the container 28 (e.g., near the center of container 28). FIG. 4 shows main conveyor 12 extending fully into container 28, wherein conveyor system 10 is properly situated to receive or unload items 24, for example, near the front of container 28.

Figure 5:
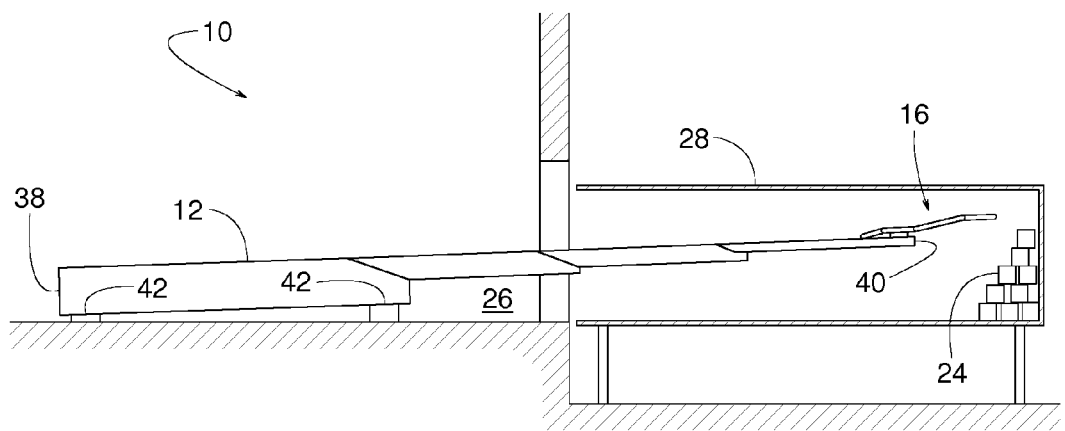
FIG. 5 is a side view similar to FIG. 4, but showing the main conveyor's front end in an elevated position.
Figure 6:
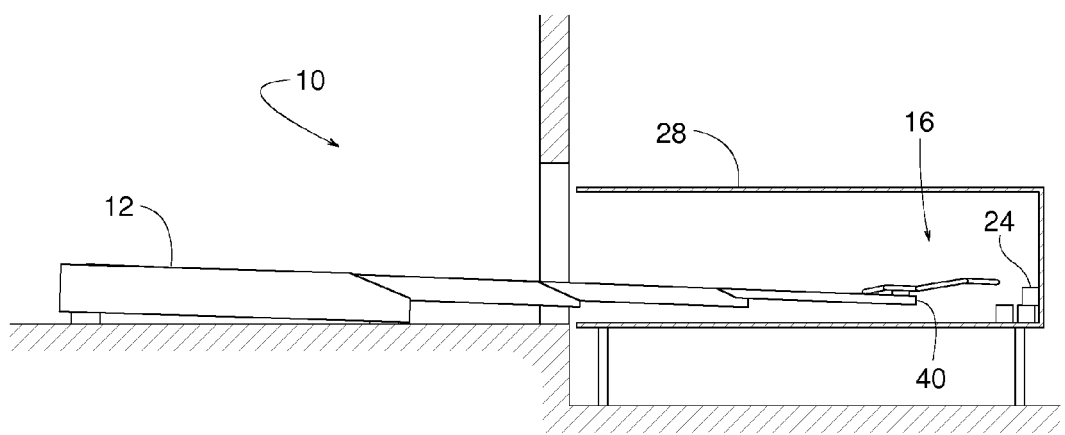
FIG. 6 is a side view similar to FIGS. 4 and 5, but showing the main conveyor's front end in a lowered position.

FIG. 5 shows front end 40 of main conveyor 12 elevated for accessing items 24 that are stacked higher relative to the upper surface 32 of the main conveyor 12. FIG. 6 shows front end 40 of main conveyor 12 lowered for accessing items 24 that are, for example, near a floor of container 28 (e.g., stacked vertically lower relative to the upper surface 32 of the main conveyor 12).

FIG. 7 shows main conveyor 12 extending partway into container 28 with distal conveyor section 16 raised for accessing a high stack of items 24. FIG. 8, is similar to FIG. 7 but shows distal conveyor section 16 at an intermediate height for accessing items 24 stacked at a medium height. FIG. 9 shows distal conveyor section 16 set at a lower height for receiving or unloading items 24 that are near the floor of container 28.

FIG. 10 shows each of the conveyor extensions 16a and 16b adjusted laterally outward so they diverge to reach items 24 at opposite sides of container 28 relative to the centerline 36. Specifically, each of the conveyor extensions 16a and 16b defines (i.e., their own) respective longitudinal centerlines 88a and 88b that in FIG. 10 are shown to be laterally displaced out of parallel alignment with each other and are also laterally displaced out of parallel alignment with the main conveyor's longitudinal centerline 36. FIG. 10 also shows two workers 22 each using their own conveyor extension 16. FIG. 11 shows conveyor extensions 16 adjusted laterally inward so both conveyor extensions 16 are conveniently positioned for receiving or unloading items 24 near the main conveyor's longitudinal centerline 36. FIG. 12 shows main conveyor 12 adjusted laterally to one side of container 28 having the centerline 88b of conveyor extension 16b in parallel alignment with centerline 36, while conveyor extension 16a is adjusted laterally outward toward items 24 near the other side of container 28 so that its centerline 88a is out of parallel alignment relative to centerline 36.

Figure 13:
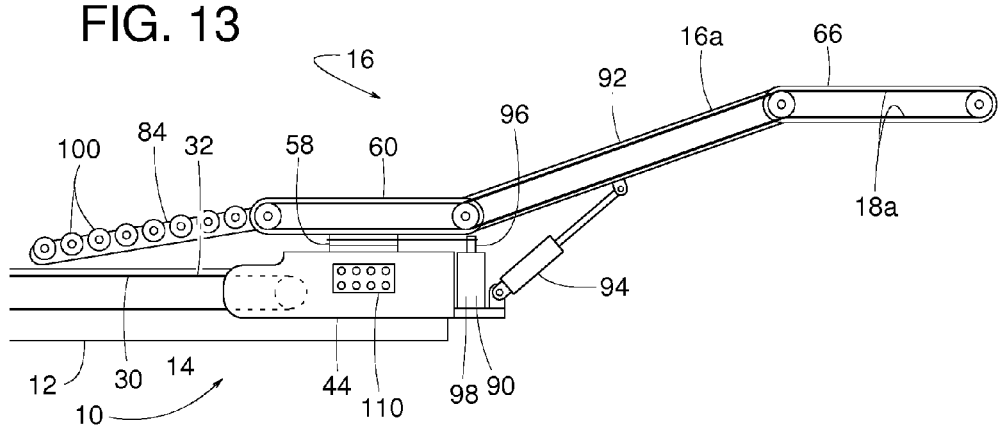
FIG. 13 is a side view of the example conveyor system of FIGS. 1-10 having both of the example conveyor extensions at a first position or an upper height.
Figure 14:
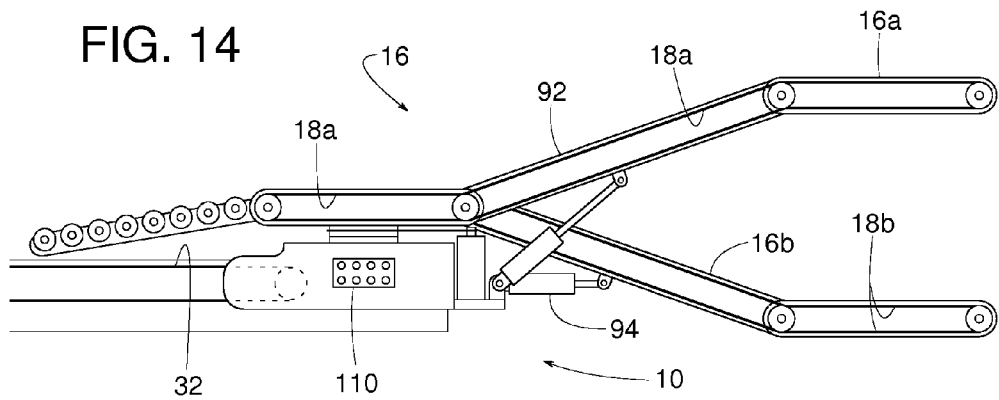
FIG. 14 is a side view similar to FIG. 13, but showing one conveyor extension at the first position or upper height and the other conveyor extension at a second position or lower height.
Figure 15:
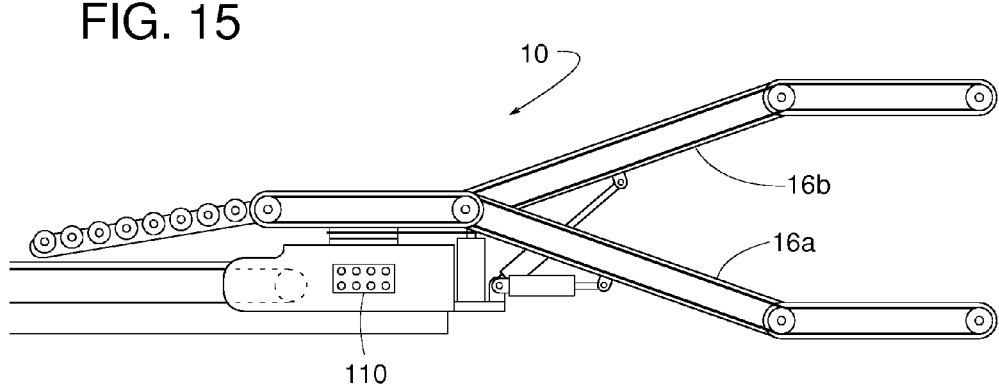
FIG. 15 is a side view similar to FIG. 14, but with the two conveyor extensions at opposite height or vertical positions.

Although the actual construction of conveyor extensions 16 may vary, some examples of conveyor extensions 16a and 16b are shown in FIGS. 13-15. For the illustrated example, each of the conveyor extensions 16a and 16b comprises proximal conveyor section 60. A swivel joint 58 rotatably couples proximal conveyor section 60 to adaptor plate 44. A drive unit 90 adjusts, rotates or swivels proximal conveyor section 60 about swivel joint 58. An intermediate conveyor section 92 pivotally couples distal conveyor section 66 to proximal conveyor section 60. An actuator 94 (e.g., a hydraulic cylinder, pneumatic cylinder, electric motor, hydraulic motor, pneumatic motor, etc.) vertically pivots intermediate conveyor section 92 so as to adjust the elevation (e.g., a vertical height) of distal conveyor section 66. The intermediate conveyor section 92 provides a substantially smooth or continuous transition or travel path between the upper surface 32 of the main conveyor 12 and the distal conveyor section 66 as items 24 move or travel between the upper surface 32 of the main conveyor and the distal conveyor section 66 when the distal conveyor section 66 is elevated (e.g., raised or lowered) relative to the upper surface 32 of the main conveyor 12 and/or when the distal conveyor section 66 (e.g., upper surface of belt 18) is substantially parallel to the upper surface 32 of the main conveyor 12. As shown, the conveyor system 10 as includes a transition conveyor section 84 to provide a transition (e.g., a smooth or continuous transition) between proximal conveyor section 60 and main conveyor belt 30 and the powered belt system 18 (e.g., a secondary powered belt system) running across proximal conveyor section 60, intermediate conveyor section 92 and distal conveyor section 66. Further structural and functional details of conveyor extension 16 are as follows. The transition conveyor section 84 may include rollers, a belt, or any other conveying surface.

Powered belt system 18, in some examples, is one continuous belt driven by a suitable drive(s). In other examples, powered belt system 18 may include individual belts for each of proximal conveyor section 60, intermediate conveyor section 92 and distal conveyor section 66, all of which are driven by any suitable drive(s). Examples of such drive(s) include, but are not limited to, an electric motor; a hydraulic motor; a pneumatic motor; and a mechanical transmission or drive train coupling the movement of main belt 30, its rollers, and/or its drive unit to the conveyor extension's belt system 18 or its rollers.

As for adjustably rotating the conveyor extension 16 about its respective swivel joint 58, drive unit 90 is schematically illustrated to represent any suitable adjustor or drive system for adjusting the lateral position of each distal conveyer section 16. Examples of drive unit 90 include, but are not limited to, a chain or belt coupling swivel joint 58 to an output shaft 96 of a motor 98, a motor/cam arrangement, a hydraulic cylinder, a mechanical linkage, and various combinations thereof.

In some examples, transition conveyor section 84 extends out over main conveyor belt 30 and comprises a series of passive rollers 100. The term, "passive" as it relates to rollers 100 means that rollers 100 are free spinning rather than powered. In some examples, rollers 100 are cylindrical, and in other examples rollers 100 are spherical. In some examples, transition conveyor section 84 includes powered rollers and/or a powered belt.

In some examples, proximal conveyor section 60, intermediate conveyor section 92 and distal conveyor section 66 are pivotally interconnected to provide a controlled articulated assembly, wherein the angular relationship between distal conveyor section 66 and proximal conveyor section 60 remains generally constant as actuator 94 adjusts the height of distal conveyor section 66. In some examples, proximal conveyor section 60 and distal conveyor section 66 remain substantially parallel to each other to ensure a smooth transition as items 24 travel between them. Further, in some examples, the distal conveyor section 66 can be positioned substantially parallel or horizontal relative to the proximal conveyor section 60 and/or the floor of, for example, the container 28.

To maintaining a desired angular relationship between proximal conveyor section 60 and distal conveyor section 66 (with an intermediate conveyor section 92' therebetween), as shown in FIG. 16, a non-rotating sprocket 102 is attached to a proximal conveyor section 66', another non-rotating sprocket 102 is affixed to a distal conveyor section 66', and a roller chain 104 couples the two sprockets 102 to each other. Such an arrangement maintains a fixed angular relationship between the two sprockets 102, which in turn maintains a fixed angular relationship between proximal conveyor section 60' and distal conveyor section 66'. In other examples, cogged wheels replace sprockets 102, and a cogged belt replaces roller chain 104.

FIG. 17 shows another example of mechanism to maintain a desired angular relationship between a proximal conveyor section 60" and a distal conveyor section 60' (with an intermediate conveyor section 92" therebetween). In this example, proximal conveyor section 60", distal conveyor section 66", and links 106 and 108 are pivotally interconnected to create a 4-bar parallelogram linkage that maintains distal conveyor section 60" parallel to proximal conveyor section 60".

In some examples where two conveyor extensions 16a and 16b are attached to main conveyor 12, the vertical and lateral adjustment of the two conveyor extensions 16a and 16b are controlled independently. This allows one distal conveyor section 66 to be positioned at a first elevation (e.g., a higher vertical position) relative to the other one of the conveyor extensions. FIG. 13 shows both distal conveyor sections 66 at substantially the same position (e.g., the same vertical or upper height) (distal conveyor section 66b is hidden behind section 66a). FIG. 14 shows distal conveyor section 66a at a first position (e.g., a vertical position that is higher or) different than the position (e.g., the vertical position) of distal conveyor section 66b with distal conveyor section 66a being above the height of main conveyor 12 and distal conveyor section 66b being below main conveyor 12 (distal section 66a is at a first upper height, and distal section 66b is at a second lower height). FIG. 15 shows distal conveyor section 66b positioned higher than distal conveyor section 66a with distal conveyor section 66b being above the height of main conveyor 12 and distal conveyor section 66a being below main conveyor 12 (distal section 66b is at a second upper height, and distal section 66a is at a first lower height). It should be noted that as each conveyor extensions 16a and 16b moves between a first or upper height and a second or lower height, intermediate conveyor section 92 tilts or moves more than either proximal conveyor section 60 and distal conveyor section 66, thereby ensuring a smooth transfer of items 24 across conveyor extensions 16a or 16b regardless of the position or height of distal conveyor section 66.

In some examples, to control the various movements and adjustments of conveyor system 10, a controller 110 is mounted near each conveyor extensions 16a and 16b. In some examples, a comparable controller provides at least one worker 22 with wireless remote control. In some examples, each worker 22 has ready access to their own controller for independently controlling a chosen one of the conveyor extensions 16a or 16b.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

What is claimed is:

1. A conveyor system, comprising:
a main conveyor comprising a frame, a powered main belt, and an upper traveling surface, the frame having a length extending between a back end and a front end of the main conveyor, the length extending along a main longitudinal centerline of the main conveyor, the front end of the main conveyor having a height that is vertically adjustable with the height being defined by the upper traveling surface of the main conveyor at the front end thereof;
a first conveyor extension carried by the frame with the first conveyor extension being in proximity with and extending beyond the front end of the main conveyor, the first conveyor extension mounted to the frame proximate the front end of the main conveyor beyond the powered main belt in a direction of the main longitudinal centerline, the first conveyor extension being adjustable between a first upper height and a first lower height relative to the height of the front end of the main conveyor, the first conveyor extension extending higher than the height of the front end of the main conveyor when the first conveyor extension is at the first upper height, the first conveyor extension extending lower than the height of the front end of the main conveyor when the first conveyor extension is in at the first lower height; and
a second conveyor extension carried by the frame with the second conveyor extension being in proximity with and extending beyond the front end of the main conveyor, the second conveyor extension mounted to the frame proximate the front end of the main conveyor beyond the powered main belt in a direction of the main longitudinal centerline, the second conveyor extension being adjustable between a second upper height and a second lower height relative to the height of the front end of the main conveyor, the second conveyor extension extending higher than the height of the front end of the main conveyor when the second conveyor extension is at the second upper height, the second conveyor extension extending lower than the height of the front end of the main conveyor when the second conveyor extension is in at the second lower height, the first conveyor extension extending higher than the second conveyor extension in one selective configuration, the first conveyor extension being lower than the second conveyor extension in a second selective configuration.

2. The conveyor system of claim 1, wherein the length of the frame from the back end to the front end is adjustable.

3. The conveyor system of claim 1, wherein each of the first conveyor extension and the second conveyor extension comprises a proximal conveyor section mounted to the frame in proximity with the front end of the main conveyor, a distal conveyor section, and an intermediate conveyor section coupling the proximal conveyor section to the distal conveyor section, the intermediate conveyor section tilting more than both the proximal conveyor section and the distal conveyor section as the first conveyor extension and the second conveyor extension move between their respective upper and lower heights.

4. The conveyor system of claim 3, wherein the distal conveyor section of the first conveyor extension remains in a substantially fixed angular relationship with the proximal conveyor section of the first conveyor extension as the first conveyor extension moves between the first upper height and the first lower height.

5. The conveyor system of claim 3, wherein the distal conveyor section of the first conveyor extension remains substantially parallel to the proximal conveyor section of the first conveyor extension as the first conveyor extension moves between the first upper height and the first lower height.

6. The conveyor system of claim 3, further comprising:
a first powered belt borne by the first conveyor extension;
a second powered belt borne by the second conveyor extension; and
a transition conveyor section extending between the main conveyor and the proximal conveyor section of each of the first conveyor extension and the second conveyor extension, the transition conveyor section comprising a plurality of passive rollers.

7. The conveyor system of claim 1, wherein the first conveyor extension defines a first longitudinal centerline, the second conveyor extension defines a second longitudinal centerline, the first longitudinal centerline and the second longitudinal centerline being laterally displaced out of parallel alignment with each other such that the first conveyor extension and the second conveyor extension diverge, the main longitudinal centerline being laterally displaced out of parallel alignment with both the first longitudinal centerline and the second longitudinal centerline.

8. The conveyor system of claim 1, further comprising:
a first swivel joint connecting the first conveyor extension to the main conveyor, thereby rendering the first conveyor extension rotatable relative to the main conveyor about a first substantially vertical axis; and
a second swivel joint connecting the second conveyor extension to the main conveyor, thereby rendering the second conveyor extension rotatable relative to the main conveyor about a second substantially vertical axis.

9. A conveyor system, comprising:
a main conveyor comprising a movable frame and an upper traveling surface, the movable frame being movable horizontally and vertically, the movable frame having a width and a length, the length extending between a back end and a front end of the main conveyor, the length extending along a main longitudinal centerline of the main conveyor, the front end of the main conveyor having a height that is vertically adjustable with the height being defined by the upper traveling surface of the main conveyor at the front end thereof;
a first conveyor extension carried by and fully supported by the movable frame with the first conveyor extension being in proximity with and extending beyond the front end of the main conveyor, the first conveyor extension mounted to the frame via a first joint located within the width of the frame, the first conveyor extension being adjustable between a first upper height and a first lower height relative to the height of the front end of the main conveyor, the first conveyor extension defining a first longitudinal centerline; and
a second conveyor extension carried by and fully supported by the movable frame with the second conveyor extension being in proximity with and extending beyond the front end of the main conveyor, the second conveyor extension mounted to the frame via a second joint located within the width of the frame, the second conveyor extension being adjustable between a second upper height and a second lower height relative to the height of the front end of the main conveyor, the second conveyor extension defining a second longitudinal centerline, the first longitudinal centerline and the second longitudinal centerline being laterally displaced out of parallel alignment with each other, the main longitudinal centerline being laterally displaced out of parallel alignment with both the first longitudinal centerline and the second longitudinal centerline.

10. The conveyor system of claim 9, wherein the length of the frame from the back end to the front end is adjustable longitudinally.

11. The conveyor system of claim 9, wherein each of the first conveyor extension and the second conveyor extension comprises a proximal conveyor section mounted to the movable frame in proximity with the front end of the main conveyor, a distal conveyor section, and an intermediate conveyor section coupling the proximal conveyor section to the distal conveyor section, the intermediate conveyor section tilting more than both the proximal conveyor section and the distal conveyor section as the first conveyor extension and the second conveyor extension move between their respective upper and lower heights.

12. The conveyor system of claim 11, wherein the distal conveyor section of the first conveyor extension remains in a substantially fixed angular relationship with the proximal conveyor section of the second conveyor extension as the first conveyor extension moves between the first upper height and the first lower height.

13. The conveyor system of claim 11, further comprising:
a powered main belt borne by the main conveyor;
a first powered belt borne by the first conveyor extension;
a second powered belt borne by the second conveyor extension; and
a transition conveyor section extending between the main conveyor and the proximal conveyor section of each of the first conveyor extension and the second conveyor extension, the transition conveyor section comprising a plurality of passive rollers.

14. The conveyor system of claim 9, wherein the first joint is a first swivel joint connecting the first conveyor extension to the main conveyor to enable the first conveyor extension to rotate relative to the main conveyor about a first substantially vertical axis; and
wherein the second joint is a second swivel joint connecting the second conveyor extension to the main conveyor to enable the second conveyor extension to rotate relative to the main conveyor about a second substantially vertical axis.

15. A conveyor system, comprising:
a main conveyor comprising a movable frame and an upper traveling surface, the movable frame having a length extending between a back end and a front end of the main conveyor, and a width defined between outer sides of the moveable frame, the length extending along a main longitudinal centerline of the main conveyor, the front end of the main conveyor having a height that is vertically adjustable with the height being defined by the upper traveling surface of the main conveyor at the front end thereof;
a first conveyor extension carried by and fully supported by the movable frame with the first conveyor extension being in proximity with and extending beyond the front end of the main conveyor, the first conveyor extension being adjustable between a first upper height and a first lower height relative to the height of the front end of the main conveyor;

a second conveyor extension carried by and fully supported by the movable frame with the second conveyor extension being in proximity with and extending beyond the front end of the main conveyor, the first and second conveyor extensions to be fully contained within the width of the main conveyor when the first and second conveyor extensions are positioned parallel to the main longitudinal centerline of the main conveyor, the second conveyor extension being adjustable between a second upper height and a second lower height relative to the height of the front end of the main conveyor; and each of the first conveyor extension and the second conveyor extension comprises a proximal conveyor section mounted to the movable frame in proximity with the front end of the main conveyor, a distal conveyor section, and an intermediate conveyor section coupling the proximal conveyor section to the distal conveyor section, the intermediate conveyor section tilting more than both the proximal conveyor section and the distal conveyor section as the first conveyor extension and the second conveyor extension move between their respective upper and lower heights.

16. The conveyor system of claim 15, wherein the length of the frame from the back end to the front end is adjustable in a longitudinal direction relative to the centerline.

17. The conveyor system of claim 15, wherein the distal conveyor section of the first conveyor extension remains in a substantially fixed angular relationship with the proximal conveyor section of the first conveyor extension as the first conveyor extension moves between the first upper height and the first lower height.

18. The conveyor system of claim 15, wherein the distal conveyor section of the first conveyor extension remains substantially parallel to the proximal conveyor section of the first conveyor extension as the first conveyor extension moves between the first upper height and the first lower height.

19. The conveyor system of claim 15, further comprising:
a powered main belt borne by the main conveyor;
a first powered belt borne by the first conveyor extension;
a second powered belt borne by the second conveyor extension; and
a transition conveyor section extending between the main conveyor and the proximal conveyor section of each of the first conveyor extension and the second conveyor extension, the transition conveyor section comprising a plurality of passive rollers.

20. The conveyor system of claim 15, wherein the first conveyor extension defines a first longitudinal centerline, the second conveyor extension defines a second longitudinal centerline, the first longitudinal centerline and the second longitudinal centerline being laterally displaced out of parallel alignment with each other such that the first conveyor extension and the second conveyor extension diverge, the main longitudinal centerline being laterally displaced out of parallel alignment with both the first longitudinal centerline and the second longitudinal centerline.

21. The conveyor system of claim 15, further comprising:
a first swivel joint connecting the first conveyor extension to the main conveyor to enable the first conveyor extension to rotate relative to the main conveyor about a first substantially vertical axis; and
a second swivel joint connecting the second conveyor extension to the main conveyor to enable the second conveyor extension to rotate relative to the main conveyor about a second substantially vertical axis.

22. The conveyor system of claim 15, wherein each of the first and second conveyor sections further comprises a transition conveyor section to couple the main conveyor to the proximal conveyor section, wherein the transition conveyor section is configured to pivot relative to the intermediate conveyor section and the distal conveyor section.

23. The conveyor system of claim 15, wherein the distal conveyor section is configured to pivot relative to the intermediate conveyor section and the proximal conveyor section as the first conveyor extension and the second conveyor extension move between their respective upper and lower heights.

* * * * *